March 11, 1969     R. L. HELLMUND     3,432,228
STILL-MOTION PHOTOGRAPHIC APPARATUS
Original Filed Nov. 13, 1963     Sheet 1 of 6

INVENTOR
RUDOLPH L. HELLMUND
BY
ATTORNEYS

March 11, 1969 R. L. HELLMUND 3,432,228
STILL-MOTION PHOTOGRAPHIC APPARATUS
Original Filed Nov. 13, 1963

INVENTOR
RUDOLPH L. HELLMUND
BY Brown, Jackson,
Boettcher & Dienner
ATTORNEYS

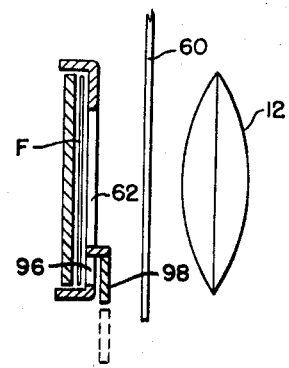
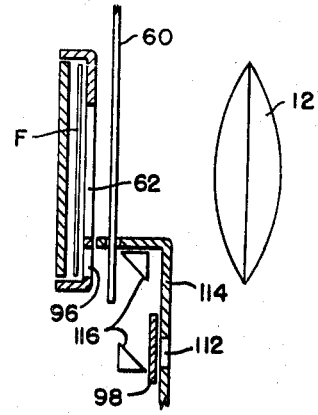
FIG. 7
FIG. 8
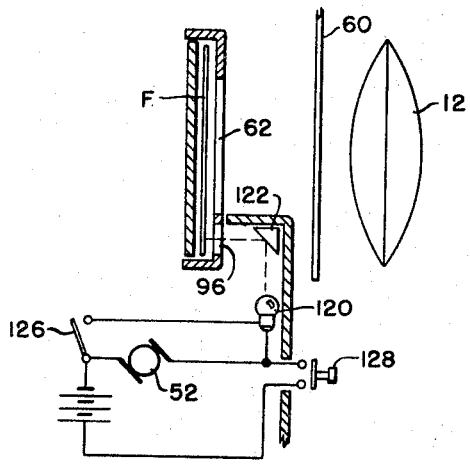
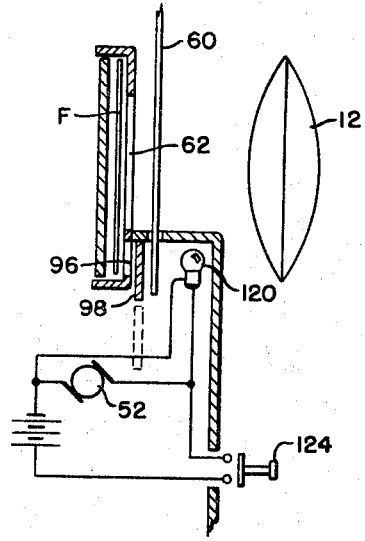
FIG. 10
FIG. 9

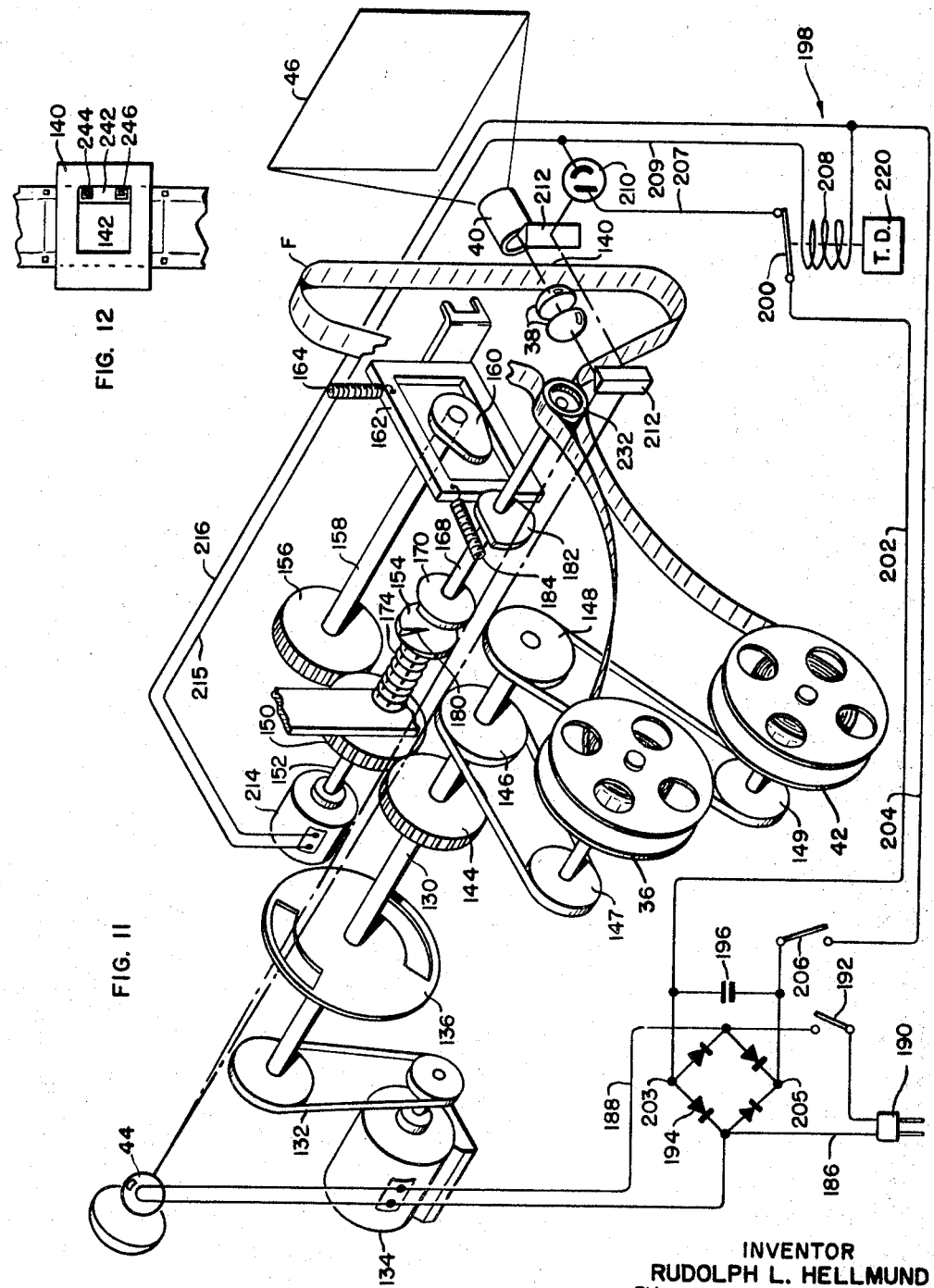

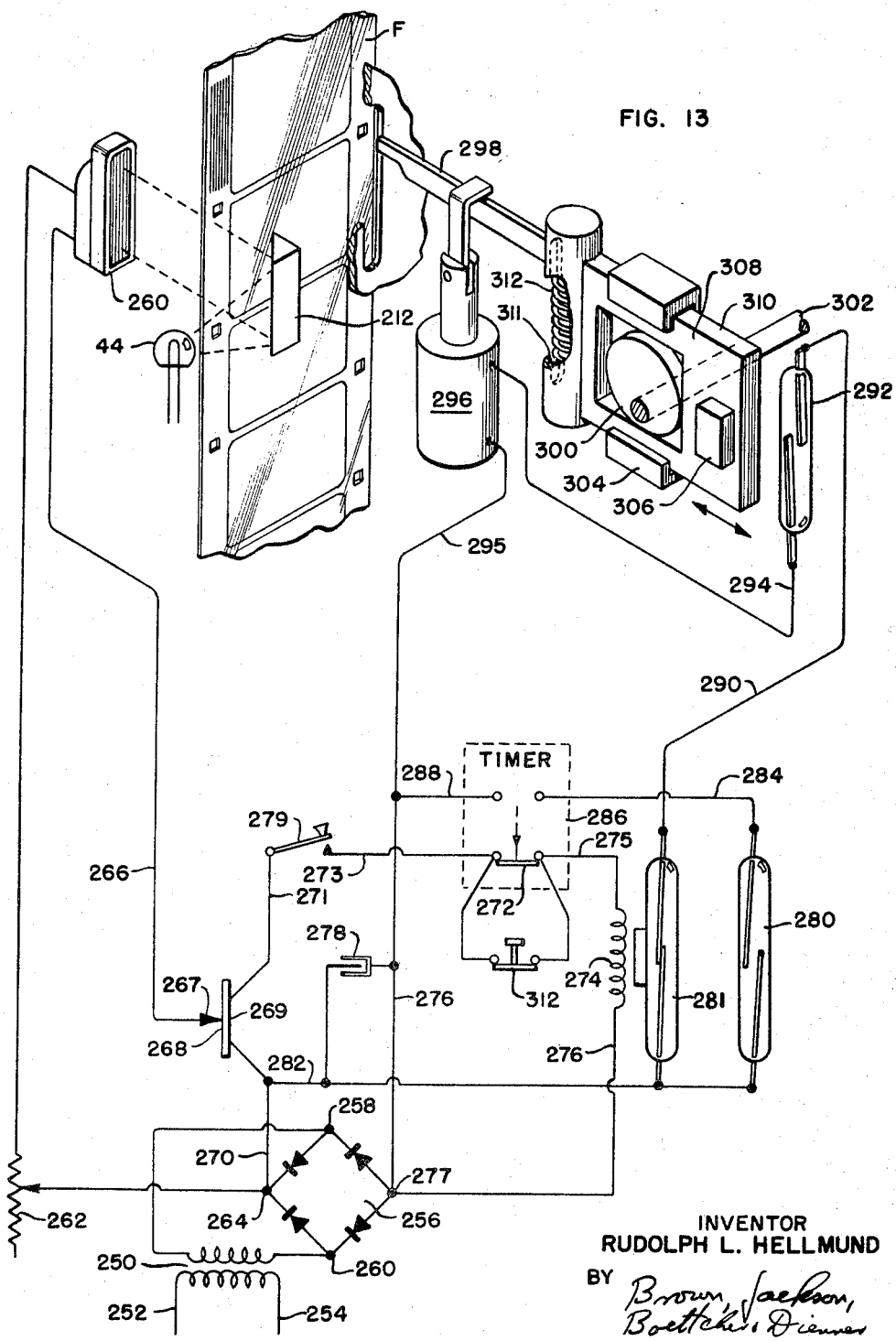

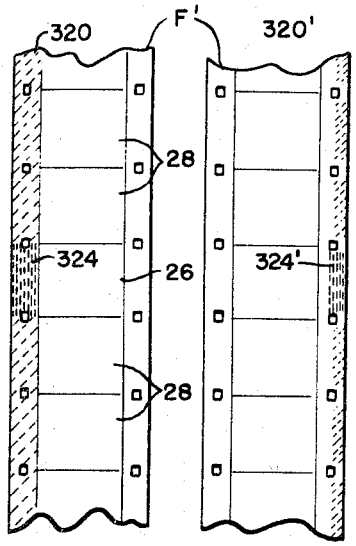
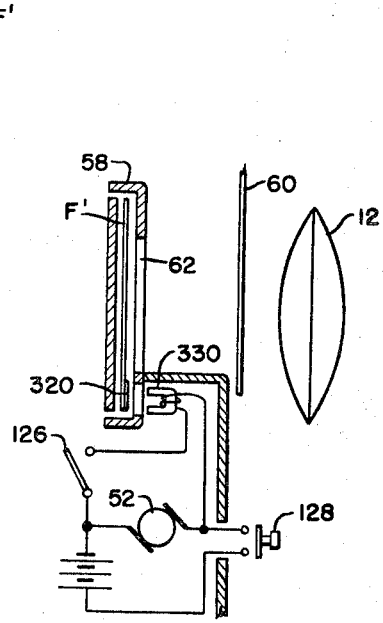
FIG. 14  FIG. 15  FIG. 16  FIG. 17
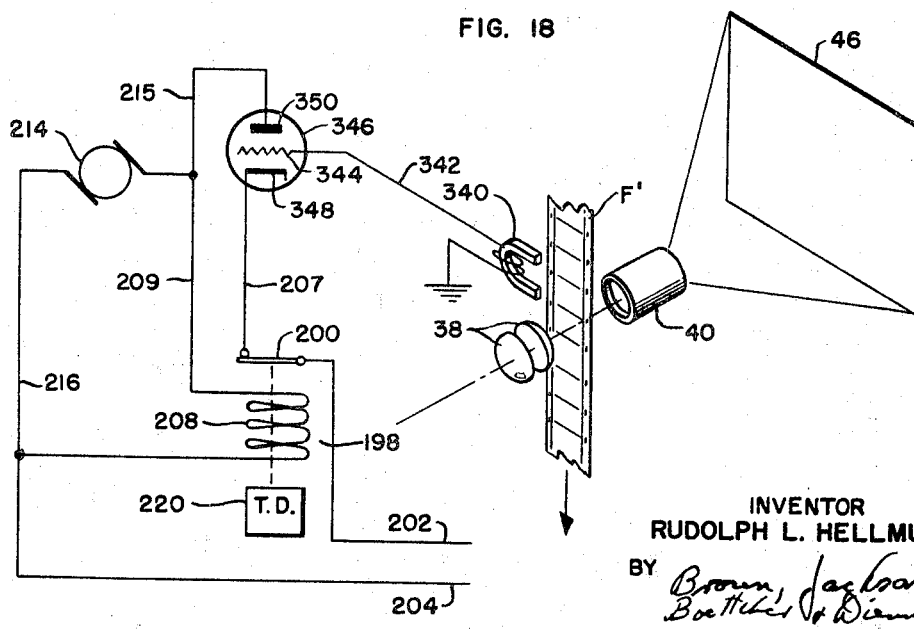
FIG. 18
INVENTOR
RUDOLPH L. HELLMUND
BY
ATTORNEYS United States Patent Office 3,432,228
Patented Mar. 11, 1969

3,432,228
STILL-MOTION PHOTOGRAPHIC APPARATUS
Rudolph L. Hellmund, 707 Central Ave.,
Wilmette, Ill. 60091
Original application Nov. 13, 1963, Ser. No. 323,463, now Patent No. 3,301,628, dated Jan. 31, 1967. Divided and this application Jan. 31, 1967, Ser. No. 635,932
U.S. Cl. 352—169                          6 Claims
Int. Cl. G03b 21/38

ABSTRACT OF THE DISCLOSURE

A motion picture camera which takes "stills" and identifies them by simultaneously exposing a portion of the film margin associated with the film frame and a motion picture projector having a photosensitive scanner which when it senses one of the exposed portions automatically stops the film movement long enough for viewing of the associated "still" frame. The horizontal and vertical movements of the film claw which intermittently feed the film through the projector in timed sequence to the shutter are effected by separate driving elements driven by the projector motor which also drives the shutter. The scanner operates a clutch so that one of the driving elements of the film claw is interrupted but not the other. The clutch also tensions a spring which introduces a substitute load on the motor when this occurs wherefore since the shutter is continuously operated to reduce the heat factor on the stopped film, changeover noise is minimized.

---

This application is a division of my copending application Ser. No. 323,463, filed Nov. 13, 1963, now Patent No. 3,301,628 and relates to photographic apparatus and more particularly to improvements in motion picture projecting apparatus selectively adaptable for projecting still pictures as well as action sequences.

A first and general object of the invention is to provide still-motion photographic apparatus having an especial appeal and usefulness to the amateur home movie enthusiast.

The average amateur takes most of his motion picture shots away from home be it on a day or a week-end trip, a summer vacation, or simply on a visit to the folks or with friends. The chances are good that over half and perhaps more of the shots he will want to take on such occasions will comprise "stills," that is they will be free of animation or will comprise scenes to which animation adds little and could well be omitted. Where these shots are made on motion picture film with conventional cameras, considerable film footage is wasted. At the same time, it is not always convenient to take along a second camera. Furthermore to equip oneself with a camera and associated projector for motion pictures plus a second camera and projector for taking and projecting slides can amount to a considerable amount of money. Then, too, there are certain scenes such as titles, signs or build-ups to an action sequence which although free of animation in the past have had to be exposed over several frames of the film, otherwise the scene would be lost in projection. Several of the newer motion picture cameras on the market have means for stopping or slowing down the film advancing means in order to allow the taking of individual pictures. However, these cameras had no means either to identify the individual pictures taken as single frame exposures or to prevent these pictures from becoming lost in projection. Consequently these have been useful primarily for taking time elapse sequence and producing animation, or where the single frame exposures are to be cut out of the developed film and enlarged to snapshot size.

Therefore, a more specific and principal object of the present invention is to provide motion picture taking and projecting apparatus with or having means which allow the operator to selectively take both motion pictures and also stills or individual pictures on the same roll of film while also simultaneously marking the film to identify each "still" as it is exposed on the film. These markings usefully trigger film holding means in the projector so that, during subsequent projection of the developed film each of the frames originally taken as a still will not be lost in projection but will be held on the screen for a determinable viewing interval of time. This time interval may be determined by the projector setting, or, optionally means may be provided under the control of the operator for lengthening or shortening the interval for viewing the individual "stills" as they are projected on the screen.

In accordance with the invention such marks are produced on the margin of the film and advantageously adjacent the frame of the film comprising the individual exposure. However, in some forms of the invention the mark may be located one or more frames ahead of the frame individually exposed so as to accommodate slower operating projectors. In one form of the invention, the film margin may be marked by simultaneously exposing the selected portion of the film margin to external light received either through the principal camera lens or through some other aperture provided in the camera body and which is caused to occur during the interval the film frame is exposed by the shutter to entrant light from the camera lens. Alternatively, the exposure of the film margin may be to an internal light source provided within the camera. Conversely, the film margin can be continuously exposed to light from either an external or internal source, the exposure thereof being interrupted during the interval of exposing a frame of the film to take a still picture. In other forms of the invention the still frames may be marked by providing the camera with means for depositing or producing magnetically charged areas in the film margin or by discharging areas of a previously magnetized or charged strip along the film margin. Although the means provided the camera for thus altering the light transmission or magnetic or electrical characteristics of the film margin may be separately actuated, conveniently such means will be associated with and under the control of the mechanism which also sets the camera for taking a still picture. In the projector, these marks are scanned by means sensitive, as the case may be, to either light directed from the projector light source or an auxiliary source onto the film margin or to magnetic changes in the film margin which it scans, and control mechanism is associated with the scanning means so that the advance of the film is halted each time one of said marks on the film margin is sensed, and so as to align the associated film frame (taken as an individual picture) for prolonged projection onto the screen. Simultaneously, said scanning means also initiates a timing device to reactuate the film advancing means at the end of a preset viewing time interval. Means may, however, be provided in substitution or addition thereto for reactuating said film advancing means manually or automatically as in response to an audible or inaudible sound from a recording device which is operated in synchronism with the film to provide accompanying sound.

Essentially all the purposes of an amateur photographer can therefore be satisfied using one camera and one projector. Furthermore the invention permits the equivalent of film slides plus motion picture sequences to be taken on the same film and thereafter displayed chronologically in a smoothly efficient and highly satisfactory manner. Although not limited thereto, the invention is particularly adapted to 16 mm. film and when used, excellent clarity and definition of image can be assured, and at an average film cost which is less than that of other present day popular systems such as 8 mm. movies and 35 mm. slides. Furthermore, since each still picture taken on the film is plainly and accurately indexed by the associated trigger area, these individual pictures can be readily located on the film for reproduction or clipping from the developed film, if this is desired. It will also be appreciated that film taken in the standard motion picture manner by means of the inventor's camera can be displayed in a conventional projector. Also motion picture film taken with a conventional camera may be conveniently displayed by means of the inventor's projector. This further contributes to the versatility of the apparatus.

In the achievement of the above, a particularly important feature of the invention is that the trigger areas can be located in the film margin outside the picture frame so that there is no loss of picture area. Secondly they are automatically located and simultaneously with the act of taking the "still." Consequently no subsequent editing of the film or special treatment need be accorded the film in the developing process. The process of developing the picture frames of the film also develops the identifying trigger areas.

A feature of the invention is that in projecting the thus marked film, the shift from motion picture to individual picture projection and back as triggered by the margin markings of the film proceeds smoothly, continuously and automatically without interruption and essentially unnoticed. The parts of the projecting apparatus are so arranged as to require a minimum shifting of parts and there is an absence of changeover noise or tell-tale change in motor speed and screen illumination which would call attention or provide distraction and, because noticed, be detrimental to satisfactory projection.

Thus, it is a feature of the invention that the shutter considered essential to adequate motion picture projection also continues to run in still projection, serving the added function of providing an intermittent heat shield for the stopped film. Thus where the projector lamp is of limited wattage (up to 750 watts) as is commonly used with 16 mm. home projectors, and with the addition of forced ventilation on the projected frame, a 50% shutter is sufficient to prevent burning or damage to the film and there is no need for moving a light dimming heat barrier into and out of the light path with accompanying variation in the screen illumination. The continued operation of the shutter also contributes continuity to both still and motion picture projection.

In addition to the shutter, other moving parts of the projecting apparatus, including selected parts of the film advancing mechanism, continue to operate during still projection as in motion picture projection so as to minimize changeover noise. Thus a further feature of the invention is that when projecting the film, the movement of the film advancing mechanism is divided into horizontal and vertical components each actuated by a separate but conjointly operating mechanism. One of these, but not both, continues to function during still picture projection. This tends to keep a constant load on the film advancing motor and so helps to maintain a constant projection noise level.

Still another feature of the invention is that the film advancing mechanism is connected to the motor through a pair of clutch discs one of which is continuously rotated by the motor and engages with the other in synchronism with the shutter. Advantageously, the clutch discs are held engaged by a suitable spring against which a solenoid operates to interrupt the film advance. The added drag caused by the increased pressure of the spring on the rotating disc when the solenoid is actuated to disengage the clutch for still projection introduces added load on the motor so that it remains relatively constant during "still" projection, even though one of the two components of the film advancing claw movements is disengaged.

Still another feature of the invention is the provision of a triggering circuit for operating the solenoid which is instantaneously sensitive to light changes on the film margin to stop the film advance for still projection and whereby the related trigger area in the film margin may be immediately adjacent the frame.

Still another feature is the provision of timing means simultaneously actuated by the triggering circuit which restarts the film advance at the end of a predetermined time interval.

Still another feature is the adaptation of said timing means or circuit therefor which permits the operator to manually restart the film advancing mechanism or to hold the still frame for a longer projection interval than the time interval for which the apparatus is preset.

Many other objects, advantages and/or features of the invention will be at once apparent and/or will become apparent from the more detailed description of preferred embodiments which follows.

Referring therefore to the drawing wherein like parts are identified by like reference numerals:

FIGURE 7 illustrates the preferred arrangement of shutter and film gate having both a picture area exposure aperture and a film margin exposure aperture wherein the two apertures are in juxtaposed relation and are exposed through the main camera lens;

FIGURE 8 illustrates an alternate construction wherein the film margin aperture is exposed through an opening or lens separate from the camera lens;

FIGURE 9 illustrates an alternative construction wherein the film margin aperture is exposed by a light source contained within the camera and energized by the button which also actuates the film advancing motor;

FIGURE 10 illustrates an alternative arrangement wherein the film margin is exposed by a built-in light source which is operated separately from the film advancing motor;

FIGURE 11 illustrates in schematic form a preferred construction of the projector in accordance with the invention;

FIGURE 12 illustrates a detail in the construction of the film gate in a projector according to FIGURE 11;

FIGURE 13 illustrates in a schematic form an alternative construction of projector, also in accordance with the invention;

FIGURE 14 illustrates a modified form of the invention wherein the film is provided with a strip of magnetizable material along one margin thereof;

FIGURE 15 illustrates a further form of the invention wherein the film is provided with a discontinuous strip of magnetizable material;

FIGURE 16 illustrates a still further form of the invention wherein the film is marked by depositing an area of magnetizable material in a portion of the film margin related to the film frame exposed by the camera for still projection;

FIGURE 17 is a schematic representation of a camera having means for magnetically marking the film to identify those film frames taken for still projection; and FIGURE 18 illustrates schematically how the projector of FIGURE 13 may be modified to accommodate the projection of still and motion pictures taken by the camera of FIGURE 17.

Figure 1:
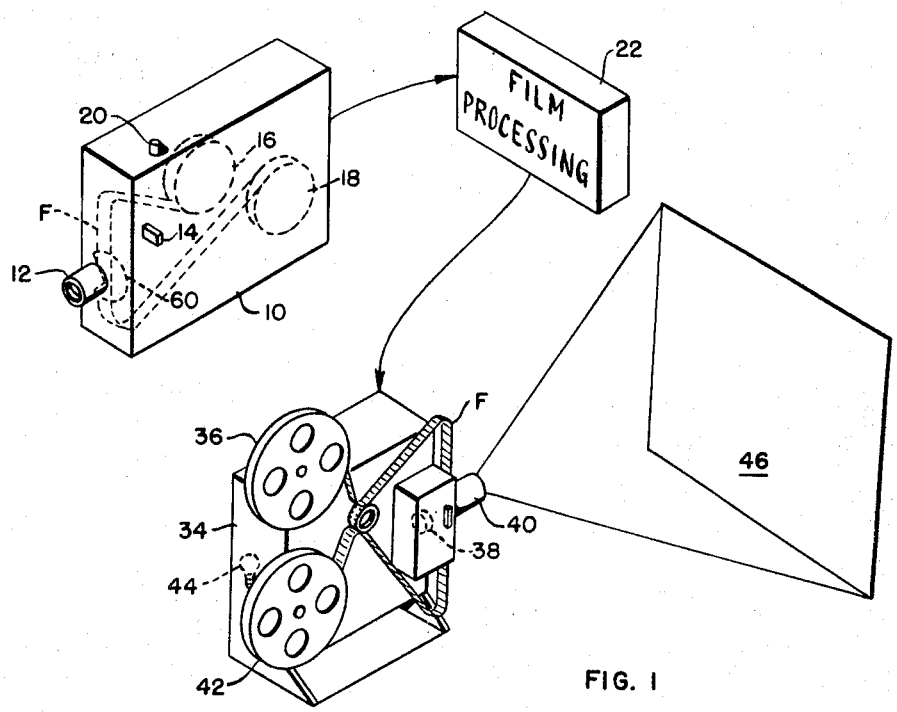
FIGURE 1 is a schematic representation of the inventive apparatus.

Referring therefore more specifically to the several views illustrating the invention and first to FIGURE 1, 10 represents a camera having lenses 12 to focus an image on sensitized film F when exposed through operation of shutter 60 by depressing button 20. Camera 10 is adapted for taking a motion picture sequence by exposing a succession of frames throuugh lenses 12. It may also be set to expose a single frame of the film when it is desired to take an individual picture or "still" as it is hereinafter referred to. 14 represents a lever in one setting of which film will be intermittently advanced from supply reel 16, momentarily halted behind lenses 12, exposed through shutter 60 and recoiled on take-up reel 18. In the case of 16 mm. film, for which the camera is particularly adapted, the frame movement and their exposure will preferably occur at the rate of 16 frames per second and will continue as long as button 20 remains depressed. In a second position of lever 14, depressing button 20 will serve to advance a single frame only of film F and to expose it. Consequently in accordance with the setting of lever 14 camera 10 may be used to take motion pictures or still pictures.

Figure 2:
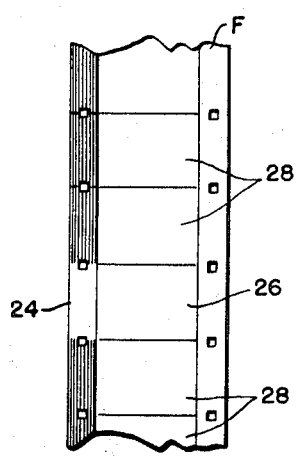
FIGURE 2 illustrates film wherein the sprocket hole area along one side of the film constitutes the trigger track or area produced by the camera for use by the projector.
Figure 3:
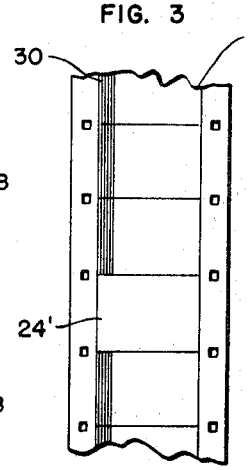
FIGURE 3 illustrates film wherein the trigger track comprises a confiscated portion of the picture area.
Figure 4:
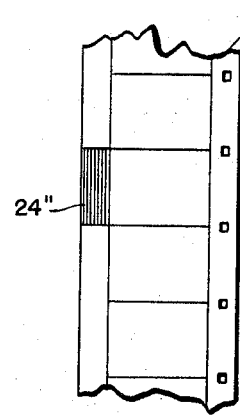
FIGURE 4 illustrates film wherein advantage is taken of its optical sound track for the trigger track.

A feature of the present invention is that, when lever 14 of camera 10 is set for single frame exposures, operation of button 20 will simultaneously cause a selected portion of the film margin indicated at 24 in FIGURE 2 to be also marked as by simultaneous exposure to light. Exposure of said marginal portion 24 serves to identify the frames of the film thus singly exposed and which in FIGURE 2 is 26. Although advantageously, the exposed marginal portion 24 will be immediately adjacent its associated film frame 26 as illustrated, it may also be located one or more frames in advance thereof. In FIGURE 2 frames 28 to either side of frame 26 do not have an associated exposed marginal portion 26. This indicates that these frames were taken as a part of an action sequence. In FIGURE 2, the portion of the film selected for simultaneous exposure to identify the single frame exposures and hereinafter identified as the "trigger track" utilizes the sprocket hole area along one of the two margins of the film. Where film is employed having sprocket holes along one margin only, as in 16 mm. sound film where the sound track comprises one margin of the film, the sound track area may be used as the trigger track (FIGURE 4). The trigger track may also comprise a confiscated portion of the picture area itself consisting of a band 30 (FIGURE 3) running lengthwise of the film between the sprocket holes along one margin of the film and the picture area. This, however, has the disadvantage that it necessarily results in narrower pictures.

FIGURE 4 illustrates a further alternative marking arrangement wherein the marks identifying the still frames may comprise an unexposed portion 24" of the film margin. In this form of the invention the film margin constituting its trigger track is continuously exposed except when taking "stills." For reasons hereinafter made clear, preferably, the markings of the film margin will comprise exposed portions thereof as illustrated at 24 in FIGURE 2 or 24' in FIGURE 3.

Referring again to FIGURE 1, the sensitized film having frames comprising motion picture sequences 28 and also single frame exposures 26 with properly located exposed identifying marks 24, 24' or 24" in their margin are processed at 22 according to the conventional method for processing movie film which consists in developing a negative from the exposed sensitized photographic film, bleaching the blackened silver therefrom without affecting the latent silver halide image, clearing the film to remove color due to the bleaching solution, completing exposure of the remaining silver halide to strong light and redeveloping this exposed silver halide to the final positive image. The film is then immersed in a fixing and hardening bath and after washing and drying is ready for loading into the still-motion projector 34 comprising the third element of the inventive apparatus illustrated by FIGURE 1. In said figure, 36 represents the supply reel into which the processed film F is loaded, and from which it is threaded through film gate 140 (FIGURE 12) located between condenser lenses 38 and projection lenses 40 onto take-up reel 42. 44 is a lamp from which light rays are directed by condenser lenses 38 through the film and projected by lenses 40 onto a screen 46 for display of the frame image. In accordance with one embodiment of the invention, a portion of this light is also directed through the margin of the film constituting the trigger track to actuate appropriately located means when portions 24, 24' or 24" having different light transmission characteristics than the rest of the trigger track come between the light and said means. The actuation of said means as hereinafter explained serves to temporarily halt the advance of the film so that the associated one of the single frame exposures is aligned in the film gate between the condenser lenses 38 and the projection lenses 40 and displayed on the screen long enough to be viewed and consequently is not lost in the projection as would be the case were the film advance in the projector not halted. Projector 34 therefore functions to automatically display action sequences and the still frames in their chronological order as they appear on the film and are aligned in the film gate.

Figure 5:
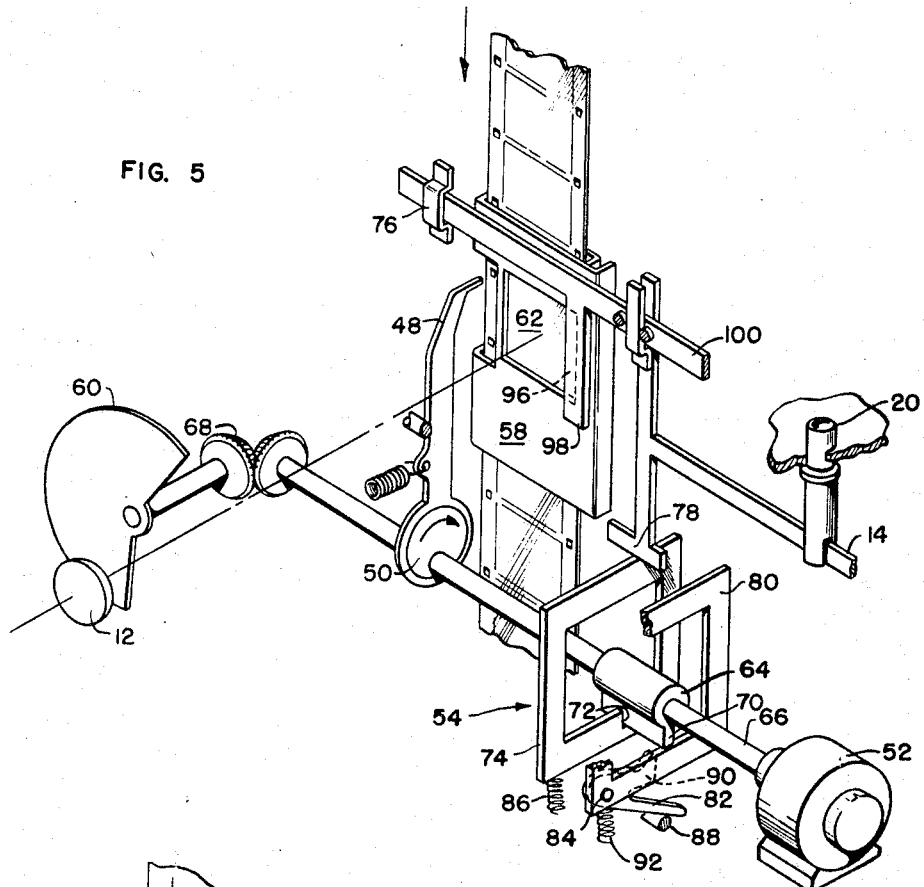
FIGURE 5 illustrate in schematic form the construction of a camera in accordance with the invention.

The camera may be a motion picture camera of conventional construction modified to produce the triggering track comprising exposed and unexposed portions or identifying marks 24, 24' or 24" as described above. Thus a camera according to the present invention comprises the usual film advancing means which is illustrated in FIGURE 5 as comprising claw 48 for engaging in the film perforations or sprocket holes along one or both margins of the film. Said claws 48 are arranged on the periphery of a drive wheel 50 rotated by motor 52 through clutching mechanism 54. Motor 52 may be either spring-operated or battery-operated. It might also be adapted for plugging into ordinary 110-volt A.C. house current. Between camera lens 12 and film gate 58 is the previously mentioned shutter 60 which is mounted on shaft 68 so as to be simultaneously rotated in synchronism with film claw actuating wheel 50. As illustrated in FIGURE 5 both wheel 50 and shutter 60 rotate clockwise and are so arranged that during the period claws 48 are carried by wheel 50 into engagement with the film sprocket holes and downwardly to pull the film downwardly with it, the opaque portion of the shutter 60 is disposed between the camera lenses 12 and the film gate 58. No light therefor reaches exposure area 62. As the claws 48 are withdrawn from the perforations in the continued rotation of drive wheel 50, the shutter uncovers the now stationary film and the same is exposed. Conventionally, cameras are operated at 16 frames a second and the pull-down of the film takes place during 180° rotation of the shutter so that the actual exposure of the film approximates $\frac{1}{32}$ of a second and until the claws are returned and ready to re-engage the film perforations again to repeat the cycle by pulling a new frame of the film into alignment with the exposure aperture 62 of film gate 58, the shutter again covering the film and exposure aperture 62 during that part of the cycle. Any suitable lever-actuated means for selectively setting the camera to permit intermittently advancing and exposing frames of film F in aperture 62 to take an action sequence or to accommodate advance of a single frame of the film and its exposure so as to take an individual picture or still may be employed. One such arrangement is illustrated in a recently issued Thiele and Hockstein U.S. Patent 3,094,033. Other arrangements are shown in Bolsey U.S. Patent 2,462,302, Gopfert et al. U.S. Patent 2,986,067 and Moomaw U.S.

Patent 2,082,074, the disclosures of which are intended to be included herein by reference.

In FIGURE 5, an appropriate lever-actuated clutching arrangement is illustrated at 54 and which comprises an enlarged generally cylindrical portion 64 disposed about shaft 66 intermediate motor 52 and wheel 50 of the film advancing mechanism including claws 48. Enlarged portion 64 has a radially projecting abutment 70 disposed on its periphery and extending axially thereof. About portion 64 is a first frame 74 having a recess or slot 72 which receives abutment 70 under the urging of spring 86 to resist turning of shaft 66 and thereby operation of the film advancing mechanism 48 and shutter 60. Axially spaced from frame 74 and also about said enlarged portion 64 is second frame 80 having a catch 82 pivotally connected to its lower left-hand end as at 84. Lever 14 is slidably supported for horizontal adjustment as by slide 100 in slideway 76 and supports an abutment 78 which in one position of horizontal adjustment engages the top of frame 74 alone and in a second position also engages the top of frame 80. In either of said adjusted positions of lever 14, button 20 is adapted to engage the same. It will thus be apparent that when lever 14 is in its first-mentioned position where its abutment 78 engages frame 74 alone, depressing button 20 will cause frame 74 to move downwardly against spring 86 so as to release abutment 70 from slot 72. Shaft 66 is then free to be turned by motor 52 and so as to operate the film advancing mechanism 48, 50 and shutter 60. As long as button 20 is held depressed, advancing mechanism 48, 50 and shutter 60 will continue to operate. However, as soon as pressure on button 20 is released the action of spring 86 will force the frame upwardly so that the abutment 70 on enlargement 64 will again engage in slot 72 stopping further film advance and exposures. However when lever 14 is in its second mentioned position where abutment 78 extends across both frame 74 and 80, it is apparent that depressing button 20 causes two things to happen. First, frame 74 will be depressed against spring 86 so as to move opening 72 away from abutment 70 and allow the motor to turn the film advancing means. However, frame 80 is also depressed, and the effect of which is to rock latch 82 about pivot 84 as it engages rod 88 so that end portion 90 of latch 82 will rise into position to engage abutment 70 as it completes one turn of shaft 66 and limits advance of the film to one frame and its exposure. On release of button 20 slot 72 in frame 74 re-engages the abutment 70 under the action of spring 86, as spring 92 also forces frame 80 upwardly and so that the latch 82 is again returned to its down position out of engagement with abutment 70. The camera is thus reset for taking a second single frame exposure by again depressing button 20. If it is desired to reset the camera for motion picture taking, lever 14 is returned to its original position where abutment 78 engages frame 74 alone. However, unlike the usual construction of a motion picture camera, film gate 58 of camera 10 also includes a film margin exposure aperture 96 which is in addition to the main or picture taking exposure aperture 62. In FIGURE 5 this second exposure aperture 96 is contiguous with and comprises an extension of the illustrated right hand side of the principal exposure aperture 62. It may, however, be separated therefrom although at the same level or it may be located one or more film frames below aperture 62. Overlying film margin exposure aperture 96 is a barrier 98 depending from slide 100 operatively connected with lever 14. As illustrated in FIGURE 5, when lever 14 is pressed to the left so that its abutment 78 engages frame 74 alone as when setting the camera for motion picture taking, barrier 98 is located to cover film margin exposure aperture 96, and so as to prevent its exposure through the camera lens 12 with operation of shutter 60. Therefore the portions of the trigger track aligned with aperture 96 remain unexposed as successive frames of the film aligned in aperture 62 are exposed by depressing button 20 to take an action sequence. When lever 14 is moved to its second position where abutment 78 engages both frames 74 and 80 to set the camera for single frame exposure, barrier 98 is thereby also moved to the right and off aperture 96. In this position film margin exposure aperture 96 is uncovered although it is still shielded from exposure through camera lens 12 by shutter 60 as is the main aperture 62. However, on depressing button 20, one frame of the film is advanced by mechanism 48 so that both the picture area aligned within aperture 62 and the film margin aligned in aperture 96 are simultaneously exposed.

Figure 6:
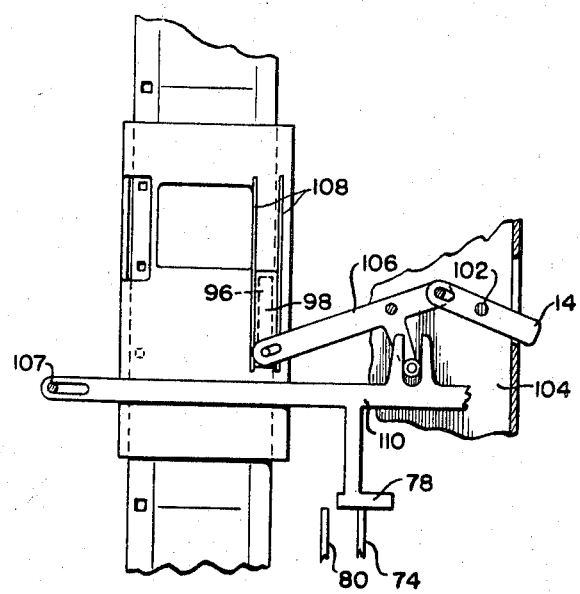
FIGURE 6 illustrates a different arrangement of film gate and offset exposure openings as well as an alternate construction of single frame exposure setting lever and removable barrier for the film margin exposure aperture.

Referring next to FIGURE 6, an alternative arrangement is illustrated for actuating clutch 54 and barrier 98. In this figure lever 14 is shown pivotally connected intermediate its ends as at 102 to wall 104 which may be a part of the film gate 58 or a portion of the camera housing. The inner end of said lever 14 is connected by arm 106 to barrier 98 so that when its outer end is pulled upwardly about pivot 102, it is able to raise it above exposure aperture 96, the barrier 98 being confined for vertical movement by slideway 108. Portion 106 is also connected by a lost motion connection to slide 110 supporting abutment 78 so that when the outer end of lever 14 is in its down position, barrier 98 covers film margin exposure aperture 96 and abutment 78 engages only frame 74. The camera is therefore set for motion picture taking by depressing button 20 against arm 110 which swings about pivot 107. However, when the outer end of lever 14 is moved to its upper position, barrier 98 is raised to uncover aperture 96 and arm 110 moves abutment 78 to a second position where it overlyingly engages both frame 74 and 80. Therefore with lever 14 in its upper position, the camera is set for taking a single frame exposure by depressing button 20. It will be further noticed that in FIGURE 6 exposure aperture 96 is shown located one frame in advance of the exposure aperture 62 which arrangement may be necessary wherein the film holding mechanism of the projector is slower operating than in the preferred embodiment. However the illustrated construction also will be useful where both exposure apertures 96 and 62 are at the same level.

It will also be understood that lever 14 could be arranged so that it overlies exposure aperture 96 when the camera is set for motion picture taking and covers said exposure aperture 96 when lever 14 is set for the camera taking single frame exposures so as to produce dark marks 24″ on the processed film as illustrated by FIGURE 4.

As thus far described, the film margin exposure aperture 96 and primary exposure aperture 62 are both located in film gate 58 (at the same level in FIGURE 5 and at different levels in FIGURE 6) so that when baffle 98 is moved to uncover aperture 96 operation of shutter 60 serves to simultaneously expose both apertures 62 and 96 to the light entering through camera lens 12. This arrangement is schematically illustrated by FIGURE 7. Other variations in accordance with the invention are, however, possible and are illustrated in FIGURES 8, 9 and 10.

Turning therefore to FIGURE 8, film margin aperture 96 is shown closed by a light occluding wall 114 so that it does not receive light from lens 12, but instead from a separate opening 112 provided in the camera housing via strategically located lenses, prisms or mirrors illustrated at 116. In this arrangement barrier 98 is located to be moved into and out of position occluding light entering through opening 112. Shutter 60 has been relocated so that its outer peripheral portion lies between exposure aperture 96 and light directing means 116. This arrangement has the advantage that because it does not depend on the exposure of aperture 96 by light through lens 12, more latitude is permitted in the location of still-motion setting lever 14. Opening 112 need not be on the front wall of the camera but may also be on the top, sides, rear or even the bottom wall of the camera housing.

The film margin may be also marked by exposing it to light received through aperture 96 from an artificial light source 120 located internally of the camera. Where the film motor 52 is driven electrically, lamp 120 may be energized from the same source of electrical power (FIGURE 9). Alternatively where the motor is spring-wound the lamp may be energized from a separate source, as for example from a miniature dry cell (FIGURE 10). The lamp 120 may be located directly in front of aperture 96 as illustrated in FIGURE 9 or it may be conveniently placed at a location remote from said aperture 96 and its light directed to aperture 96 by means of strategically located lenses, prisms or mirrors as for example illustrated at 122 in FIGURE 10. Aperture 96 may be covered by a removable barrier 98 under the control of lever 14 as in the preferred embodiment of FIGURE 5. For example, in the arrangement of FIGURE 9, the lamp is located in the motor circuit which is actuated by depressing button 124. In this arrangement shutter 60 is disposed between the light source 120 and the baffle 98 which removably overlies film margin exposure aperture 96. Therefore when lever 14 is set for a single frame exposure baffle 98 is withdrawn to the position shown in dotted lines uncovering aperture 96. Depressing button 124 therefore energizes motor 52 sufficiently to advance the film one frame and expose the same through aperture 62. Simultaneously it also energizes lamp 120 so that in the interval when the shutter permits exposure of the film frame through aperture 62 lamp 120 also exposes the film margin through aperture 96. When lever 14 is set for taking motion pictures, although the lamp 120 is also energized when button 124 is depressed to energize motor 52, baffle 98 covers aperture 96 so that the film margin is not exposed through aperture 96 with rotation of shutter 60.

The control circuit for lamp 120 can also be so arranged that it will be energized only when lever 14 is set for taking a single frame exposure and then only during the moment of actual exposure of the film margin through aperture 96. In such an arrangement the shutter 60 is not required to shield aperture 96 and barrier 98 therefore may also be omitted. Thus in FIGURE 10 lamp 120 is shown in a circuit separate from motor 52 but including a normally open switch 126 which is closed by setting still motion lever 14 to its position adapting the camera for taking single frame exposures. As illustrated button 128 therefore may be depressed when lever 14 is properly set to simultaneously energize lamp 120 to expose the film margin through aperture 96 and simultaneously advance a single frame of the film for exposure through aperture 62. In this arrangement the same button may be depressed to drive motor 52 when lever 14 is set for taking motion pictures. Conceivably lever 14 and switch 126 may be omitted and separate circuits devised for operating the motor 52, one circuit being designed to expose successive frames of the film for taking motion picture sequences and the second for obtaining a single frame exposure and also energizing lamp 120 to mark the film margin through aperture 96. Many other variations and/or modifications will at once suggest themselves and are intended to be included within the definitions of the invention as set forth in the appended claims. It will also be understood that camera 10 may be provided with numerous controls and accessories conventional to motion picture cameras. Clutch 54 also may be provided with a third frame which may be actuated by a third position of lever 14 for single frame time exposures (U.S. Patents 2,462,302 and 2,986,067, supra).

THE PROJECTOR

In accordance with the invention, a projector for displaying the still and motion images thus formed on the film F by camera 10 distinguishes from conventional projectors in that its film advancing mechanism is divided into its horizontal and vertical components one of which may be temporarily halted by an optical reading head employing either a photoelectric or photo-sensitive resistance wire principle located to read the identifying marks 24, 24' or 24'' produced by camera 10 in the film margin or trigger track of the film F. The film is therefore automatically halted each time a "still" is aligned in the film gate so that it remains projected on the screen for a determinable viewing interval.

Referring therefore to FIGURE 11, a projector adapted to automatically project and accommodate its film advancing mechanism to enable projection of both still and motion sequences when they are presented to the film gate in the projector will, in accordance with one form of the invention, comprise a main shaft 130 driven by projector motor 134 through a standard ratio belt pulley system indicated generally at 132. Mounted on shaft 130 to turn therewith is shutter 136 arranged to have opaque and clear areas which intercept the path of light from lamp 44 directed through the condenser lenses 38 to film gate 140 and which is focused by projection lenses 40 so that an image of the film frame aligned in opening 142 of the film gate is displayed on screen 46. Shaft 130 also actuates film advancing mechanism in synchronization with shutter 136 so that during the interval in which each film frame is being moved into alignment with aperture 142 in the film gate 140 the opaque portion of shutter 136 will occlude passage of light and so that the clear portions of the shutter permit projection only during the interval the film frame is held stationary within the film gate 140.

As illustrated in FIGURE 11 the film advancing mechanism comprises a first gear 144 mounted on shaft 130 to turn therewith. Gear 144 meshes with gear 150 so as to turn shaft 152 having a first clutch disc 154 fixed at one end thereof. Shaft 152 is keyed to gear 150 so that it may slide axially thereof but cannot turn in its connection therewith. Clutch disc 154 thus continues to rotate with the operation of projector motor 134. Gear 150 also continuously drives a further gear 156 on shaft 158 to rotate offset cam 160. Cam 160 operates within claw carriage 162 to vertically reciprocate film claws 166 in cooperation with spring 164. It will be apparent that film claws 166 therefore continue to reciprocate in a vertical direction throughout the operation of the projector. Concentrically aligned with shaft 152 and opposite the first mentioned clutch disc 154 is a second rotatably supported shaft 168 having a clutch disc 170 adjacently disposed to clutch disc 154. About shaft 152 and confined between first clutch disc 154 and abutment portion 172 is a spring 174 which urges clutch disc 154 into engagement with clutch disc 170. As indicated in FIGURE 11 both clutch discs 154 and 170 are provided with steps 180 which flare outwardly toward their circumference and are located approximately 180 degrees apart so that they are always engaged in synchronism with the shutter. Mounted on shaft 168 to rotate with clutch disc 170 is an offset cam 182 which engages claw carriage 162. Therefore with the two clutch discs 154 and 170 in engagement horizontal reciprocal movement is also afforded to the film claws 166 through the rotation of projector motor 134 in order to move said claws 166 into and out of engagement with the film sprocket holes. The vertical and horizontal reciprocation of claw carriage 162 thus introduced by cams 160 and 182 respectively are so related that cam 182 first moves the claws 166 into engagement with the film at the top of its vertical stroke so that as cam 160 forces carriages 162 downwardly against the pull of spring 164, the film advances. At the moment the greatest radial portion of cam 160 is presented to carriage 162, a new frame of film F has been properly aligned with opening 142 of film gate 140, Cam 182 has also turned sufficiently to allow springs 184 to disengage claws 166 from the sprocket holes of the film. As both cams continue to rotate, springs 184 move the carriage further to the left of FIGURE 11 and spring 164 raises the carriage so as to reposition the claws 166 to repeat their function of intermittently advancing the film at the rate of 16 frames per second and holding the frame stationary for an interval of 1/32 second as a clear portion of shutter 136 allows projection of the aligned and stationary film frame onto screen 46.

Referring still to FIGURE 11, plug 190 connects projector 34 to a source of electrical power which may be ordinary 115 60-cycle A.C. house current, lines 186, 188 thereby supplying power to lamp 44 and projector motor 134 when master switch 192 in line 188 is closed. Also connected to said lines 186, 188 is rectifier 194 which operates in conjunction with condenser 196 to provide a source of direct current for the film advance operating mechanism control circuit indicated generally at 198. Control circuit 198 is illustrated as connected by lead 202 to rectifier 194 at 203 intermediate its connections with lines 186, 188 and by a second lead 204 connected at 205 intermediate the connections of rectifier 194 with supply lines 186, 188, condenser 196 being shown connected in parallel across said lines 202, 204. A switch is provided at 206 which serves to manually deactivate the control circuit at the operator's election. With switch 206 in its open position, projector 34 operates in conventional manner so as to display a succession of film frames on screen 46 at the rate of 16 frames per second or at such other rate for which the projector may be designed and in accordance with the rate at which the film was exposed in camera 10. However, closing switch 206 completes a circuit from rectifier 194, line 202, switch 206, line 207, light activated switch 210, line 209, timing solenoid 208, and line 204 back to rectifier 194. As illustrated in FIGURE 11, the light activated switch 210 is positioned so as to receive light rays projected from lamp source 44 or some auxiliary source through the film margin comprising the trigger track, as aforedescribed, and directed to said switch by prism 212. Switch 210 is of the type which is activated by light so that when a clear area 24 or 24′ is aligned in gate 240 with prism 212, light switch 210 closes, allowing current to flow through the timer 208 via the circuit as previously described, but also via line 215 to solenoid 214, and line 216 to line 204. In this condition of switch 210, both timer 208 and solenoid 214 are energized. Energizing solenoid 214 effectively moves shaft 152 on its axially sliding connection with gear 156 to disengage clutch disc 154 from clutch disc 170 against the action of spring 174, thus interrupting the horizontal component of the movements of the clay carriage 162. Advance of film F is therefore halted. However film claw 66 continues to reciprocate vertically, compression of spring 174 substituting a load on projector motor 134 for that load provided when the two clutch discs 154 were engaged to horizontally reciprocate the claw carriage 162 Consequently, although shaft 168 does not turn, shafts 130, 152 and 158 continue to turn and with the substituted load on the motor introduced by the compression of spring 184, the projector noise level does not materially change.

On disengagement of the two clutch discs, springs 184 act to quickly bring to rest the claw carriage so that shaft 168 instantaneously stops. At the same time, solenoid 208 is energized to start timer 220. Timer 220, thus actuated, times out after a predetermined interval which may be manually preset by the operator if desired so as to momentarily open switch 200. Opening switch 200 interrupts the circuit to deactivate both solenoid 214 and timer coil 208. Immediately the energy stored in spring 174 by its compression under the action of solenoid 214 is released, returning clutch disc 154 into engagement with clutch 170 so that cam 182 restores horizontal reciprocation of the claw carriage, causing the film F to advance through at least one complete revolution of cam shaft 168 and thereby to move the film at least one frame. If the next trigger area on the film is clear, switch 210 will again be activated and so as to again halt the film advance, solenoid 214 and timer 220 again being actuated to hold the still frame aligned in the film gate for a time interval determined by timer 220. On the other hand, if the portion of the trigger area next aligned with the film gate is dark, that is, was unexposed in camera 10, then switch 210 will not be activated and projection of the film frame will continue successively, as in motion picture projecting, and until the next clear trigger area is aligned in the film gate and reactivates switch 210. It will be appreciated that pulleys 146 and 147 symbolize standard slip pulley arrangements for winding and rewinding the feed reel 36 and likewise pulleys 148 and 149 symbolize a standard slip pulley arrangement used on standard projectors to operate take-up reel 42. It will be further understood that although sprocket 232 is illustrated in FIGURE 11 as disposed on the same shaft as clutch disc 170, this is merely for convenience in illustration whereas, in fact, it will be provided on a shaft of its own operated with rotation of shaft 168 through a set of gears in proper ratio.

Preferably the light activator switch 210 will be of the type such as represented by General Electric's ZJ235 which as described by its manufacturer is a sub-minature silicon PNPN switch extremely sensitive to light changes. It has been calculated that, with shaft 152 turning at the rate of 16 r.p.s. to advance the film through the projector film gate for conventional motion picture projector, it requires approximately 50 milliseconds per revolution for solenoid 214 to halt the film advance. Since the usually available mechanical magnetic relays for declutching the film advancing claw require 10 to 30 milliseconds to operate, there is insufficient time for the solenoid to disengage the clutch before the film to the next frame. One way to accomplish this is, as mentioned, by locating the clear area 24 or 24′ or 24″ on the film margin trigger track, the necessary number of frames in advance of the frame to be halted for still projection which will accomplish the desired result. However, a light activated switch of the G.E. type ZJ235 comprising a silicon photo voltaic device, when unenergized acts as a normally open contact rated at 250 milliamperes at 35° C. and up to 400 volts with only a 1 to 10 micro amperage leak in its off condition. It however responds to light in the .4 to 1.1 micron region, peaking roughly at .8 micron and with such rapidity that it becomes energized and so as to operate solenoids up to 150 watts without further solid state amplification in a matter of a few microseconds, which is more than sufficient to obtain disengagement between clutches 154 and 170 to stop film advance when mark 24 is also in the opening of the film gate containing the film frame which is to be halted for still projection.

Referring to FIGURE 12 where the trigger area is provided on the margin of the film which includes sprocket holes as in the embodiment according to FIGURE 2, there is a possibility of light spilling through the sprocket holes in the mark 24 onto the light activated switch 210 when exposed through shutter 136. This may be compensated for by reducing the dimensions of the aperture opening 142 along the side thereof through which the trigger track moves so that the sprocket holes lie outside the opening 142 of the film gate when the film frame is stationary and shutter 136 allows light to enter the opening 140. This portion of the opening in the film gate 140 may also be covered by a transparent plate 242 having opaque portions 244 and 246 in the areas thereof corresponding to the location of sprocket holes of the film frame when it is properly aligned and in its "at rest" position in said gate 142. These opaque areas 244, 246 will thus bar the passage of light through the sprocket holes so as to avoid prematurely activating the switch 210 when the trigger area is otherwise dark. At the same time these opaque areas 244, 246 will comprise such a small portion of the total area of plate 242 that there will be sufficient light to activate switch 210.

Turning now to FIGURE 13, an alternate arrangement which may be provided projector 34 for controlling the advancement of film therein for still and motion picture projection is there illustrated utilizing a dry reed relay. Although not as pompt as the arrangement illustrated by FIGURE 3 using a PNPN light activated silicon switch, the arrangement is believed nevertheless sufficiently fast that the control markings 24 may be also located adjacent the frame which is to be halted for still projection. Alternatively they also may be located adjacent the next immediately preceding frame. In said FIGURE 13 a transformer 250 is illustrated having one side connected to an A.C. source of 115 volts, 60 c.p.s. electrical power by lead lines 252 and 254, the other side of the transformer being connected to a full wave rectifier 256 in conventional manner as illustrated at 258 and 260. The projector lamp 44 and motor (not shown in FIGURE 13) are also connected to said source of power through a common master control switch and so as to remain operating as long as the projector runs. In the embodiment of FIGURE 11, light rays were described as directed from the main source 44 or from some auxiliary source through the trigger track by operation of shutter 134 simultaneously as it permitted light to illuminate a film frame in the film gate for projection by lenses 40 onto screen 46. However in place of light switch 210 activated by the transmission of light allowed to impinge thereon when a clear portion 24 of said track is aligned with the film gate, in the embodiment of FIGURE 13, a photoelectric sensor 260 is substituted therefor and which when energized by light impinging thereon after passing through a clear portion of the film trigger track completes a circuit through variable resistor 262 to tap 264 in the full wave rectifier 256, line 270, one side of amplifier 268 and 267 thereof, and line 266 back to the other side of photoelectric sensor 260. A circuit is also shown completed through amplifier 268 from tap 264 in the full wave rectifier via line 270 connected to one side thereof, line 271 connecting the other side thereof to normally open switch 279, line 273, the normally closed contact 272 of timer 286, line 275, relay coil 274, line 276 to tap 277 of the full wave rectifier 256. The first mentioned side of amplifier connected via line 270 to the rectifier 256 is also connected via line 282 to one end of the normally closed element 281 and also to one end of the normally open element 280 of the dry reed relay. A condenser 278 is connected across lines 282 and 276. The opposite end of the normally open element 280 is connected via line 284, timing element 286, line 288 back to tap connection 277. The opposite end of the normally closed element 281 is connected via line 290 to one side of reed switch 292, the other side of the switch to line 294 to film travel solenoid 296, and line 295 to line 288 back to tap connection 277. FIGURE 13 further shows film claw 298 adapted for horizontal reciprocation and vertical reciprocation. Horizontal reciprocation of claw 298 is obtained by means of an off-center cam 300 which turns within a provided opening in claw supporting carriage 308 and is continuously rotated by a shaft 302 driven by the projector motor 134 (not shown). As illustrated in FIGURE 13, slideways 304 confine the movement of carriage 308 and thereby its claws 298 into and out of engagement with the sprocket holes in the film F. Claw portion 298 is also supported for vertical reciprocation on carriage 308, spring 312 tending to urge claw portion to the top of its vertical stroke as determined by slot 311, and solenoid 296 when actuated moving claw portion 298 against the reaction of spring 312. Rear portion 310 of carriage 308 serves as a shield between permanent magnet 306 and the reed switch when the carriage 308 is in its most retracted position as illustrated. The advance of the film to accommodate motion picture projection and time-delayed projection of still frames is thereby controlled as follows:

Assuming switch 280 to be set in its illustrated open position and timer contact 272 in its illustrated normally closed position, as the film carriage 308 is moved forwardly under the actuation of cam 300 so that claw 298 engages in the sprocket holes of film F, end portion 310 of carriage 308 is moved from its shielding position between permanent magnet 306 and reed switch 292. Under this condition, reed switch 292 closes, completing the circuit including its normally closed element 281 and solenoid 296. Solenoid 296 is therefore actuated causing claw 298 to move downwardly against the action of spring 312 as it engages in the film sprocket holes to advance the film through one frame of travel. Cam 300 will then have been rotated by the projector motor to a position where its larger radius returns carriage 308 to its starting position, disengaging claw 298 from the sprocket holes of the film and so that its portion 310 reassigns a shielding position between magnet 306 and reed switch 292. The latter therefore opens and solenoid 296 is deenergized whereupon spring 312 returns film claw 298 to its upper vertical position ready to repeat the film advancing cycle. Closing switch 270 will not change this operating sequence as long as the portion of the trigger track on the film F aligned with the photoelectric sensor 260 is "dark." This is because the variable resistor 262 in accordance with the invention is set so as to have insufficient current flow from the amplifier to operate the reed relay. When a "clear" portion 24 on film F is aligned with the photoelectric sensor 260, light impinging on the photoelectric sensor 260 produces sufficient bias on the amplifier grid 269 as to allow current to flow through the reed relay coil 274. This does two things. First, normally closed element 281 of the dry reed relay opens, causing the film travel solenoid 296 to be deenergized irrespective of whether the reed switch 292 is closed or opened in response to horizontal reciprocation of the carriage 308. Therefore, claw 298 continues to travel back and forth in a straight line, entering and exiting from the sprocket holes of the film F. However, the film does not move. At the same time, the normally open element 280 of the dry reed relay also closes energizing timer 286 which after a predetermined and preferably adjustable time interval opens its normally closed contact 272 deenergizing the reed relay. Normally closed contact 278 therefore recloses, causing the film travel solenoid 296 to again be energized at the proper moment in the horizontal reciprocation of carriage 308 and so as to move the film to the next frame. A manual release button is preferably also provided at 312 in parallel with the timer contacts which can be closed by the operator to release a still frame sooner than the time interval for which the timer 286 is set.

It will be appreciated that various other circuits and controls may be devised to control film advance in the projector to accommodate still and motion picture projection in accordance with whether a "dark" or "clear" portion of the trigger track of the film as produced in camera 10 is aligned with a photo sensitive type switch. It will also be appreciated that variations in the timing mechanism can be provided and in addition a manual button may be provided to override the timer which will allow the operator at his will to re-engage the clutch discs as in the embodiment of FIGURE 10, or to override the reed relay as in the embodiment of FIGURE 12 so as to hasten or delay its actuation of the claw carriage, thus providing varying time periods for each still picture as the operator may desire. It is also contemplated that a switch may be provided to effect either completely automatic or completely manual control of the stopping and starting of the film advance for still projection.

Moreover timing device 220 of FIGURE 11 and 286 of FIGURE 13 may also be replaced or modified to respond to an audible or inaudible signal of high frequency from a separate tape or record being played in conjunction with operation of the projector and which will therefore serve to synchronize the motion sequences and still frame projections with the provided "sound."

As thus far described, triggering of the film advancing mechanism in projector 34 has been described as initiated by a change in the light transmission characteristics of the film margin as sensed by photo means 210 (FIGURE 11) or 260 (FIGURE 13). However, it can also be triggered by a change in the magnetic characteristics of the film margin. Thus referring to FIGURE 14, film F is illustrated as provided with a narrow strip 320 or coating of an adherent material containing a magnetizable substance such as iron filings or pulverized iron oxide. Such a film when loaded into a camera such as illustrated by FIGURE 17 is adapted for taking still or motion picture sequences. In said FIGURE 17 film F is illustrated as disposed forwardly of film platen 58, the camera having an aperture 62 through which the film frame aligned with platen 58 may be exposed to light passing through lens 12 as accommodated by shutter 60. The film-driving mechanism will be generally as illustrated in FIGURE 5. The camera of FIGURE 17 is therefore to be considered generally similar to the camera as illustrated by FIGURES 5 and 10 modified to accommodate marking the film margin by magnetizing portions of the magnetizable strip 320. At 128 is a button which when pressed completes a circuit for energizing the film-driving motor 52. At 126 is a normally open switch which is operated from externally of the camera and when closed completes a circuit through an electromagnetic head illustrated at 330. It will be recognized that with switch 126 open, depressing button 128 serves to actuate motor 52 so that the frames of film F are successively aligned with aperture 62 and individually exposed through shutter 60 to produce a sequence of motion picture frames identified at 28 in FIGURE 14. However, by closing switch 126 which is obtained by setting mechanism lever 14 so that clutch 54 will accommodate advance of a single frame and exposure thereof on closing switch 128, electro-magnetic head 330 will also be energized so as to magnetize the aligned portion 324 in the margin of the film. Since in this setting the camera is set for single frame advancement and exposure, magnetized area 324 will therefore identify the frame 26 taken by the camera of FIGURE 17 for still projection. Switch 126 may be also adapted as a normally closed switch so as to be opened only when lever 14 is set for the taking of a single exposure. In this alternate arrangement, with lever 14 in position so that the camera takes motion picture sequences, when button 128 is depressed, the aligned portions of strip 320 also will be magnetized by magnetic head 330 and still projection frames 28 will be identified by non-magnetized areas. Strip 320 may be a continuous strip of magnetizable material as illustrated at 320 in FIGURE 14, or it may comprise a plurality of spaced areas one aligned with each frame of the film as illustrated at 320' in FIGURE 15.

Electro-magnetic head 330 also may be replaced by an electro-relay-operated nozzle connected to a suitable source or supply for spraying a deposit of magnetizable material onto the film margin. In this arrangement when lever 14 is set in position so that the camera is adapted for still picture-taking, the pressing of button 128 will spray or otherwise deposit magnetizable material at 324" (FIGURE 16). These areas may be subsequently magnetized as a part of the film developing process at 22 of FIGURE 1.

Referring now to FIGURE 18, said figure illustrates how the projector of FIGURE 11 may be modified by substituting a magnetic reading head 340, as commonly found in magnetic recorders, computers and data processing equipment, for the previously described photo means 210. In this arrangement of the projector, no auxiliary light source is needed and prisms 212 are omitted. Referring to FIGURE 18, magnetic reading head 340 is shown connected by lead 342 to the grid 344 of triode 346 which will preferably be a gas filled thyratron tube having an anode 348 and cathode 350. Anode 348 is connected by line 207 to the normally closed switch 200 of timing device 198, cathode 350 being connected by line 215 to one side of solenoid 214 (see FIGURE 11) and to the one side of the relay coil 208 of said timing device 198 via line 209. In other respects the circuitry will be as in the embodiment of FIGURE 11.

It will be appreciated that when an area of magnetized material such as 324, 324' or 324" is aligned with head 340 the effect is to induce a current flow to grid 344 so as to complete a circuit via lines 202 and 204 to solenoid 214, which stops the film motion and at the same time energizes the timing device 220. As previously described (FIGURE 11) at the end of a predetermined interval, timing device 220 serves to open switch 200, interrupting the circuit to motor 214 and allowing clutching mechanism 262 to again intiate movement of the film for motion picture projection.

It will be appreciated that the arrangement as thus described may be sufficiently slow and wherefor, advantageously, areas 324, 324' and 324" may be located one or more frames in advance of the film frame 26 intended for still projection. It will also be appreciated that the current generated on grid 344 may be sufficiently insignificant as to require amplification through one or more stages. However, such is well known and the means of amplification represent no part of the present invention.

It will be appreciated that other variations in arrangeent and structure of the component parts of the camera and projector will be possible. For example, the camera can be provided with means for magnetizing only selected areas of the film strip, or it can be adapted to reversely orient the aligned portion of the magnetic coating only when lever 14 has been adjusted to set the camera for taking still or individually exposed frames. The entire magnetic strip along the film margin also can be precharged and the camera provided with means at 330 for discharging, demagnetizing or otherwise neutralizing a charged area of the film strip immediately adjacent "still" frames. Corresponding modifications of the projector as illustrated in FIGURE 18 would also follow. Thus it will be apparent from the above description of preferred embodiments of the invention and variations thereof that many changes, as well as rearrangement of parts and modifications thereof may be made all within the spirit of the invention as defined by the appended claims and are intended to be included therein. From the description, it also will be apparent that all of the objects, advantages and features recited for the invention have been demonstrated as obtainable in a convenient and completely practical manner both from a manufacturing point of view and in a smoothly efficient and satisfactorily operating camera and/or projector, considered from the user's point of view.

Having described my invention, I claim:

1. In a motion picture projector having a light source, an objective, a film gate intermediate the objective and light source through which film is passed for projection of an image of each frame thereof onto a screen located forwardly of the objective, a motor, shutter means located between the film gate and light source and adapted to be continuously driven by said motor, a film engaging claw, a first means operated by said motor for moving the claw into and out of engagement with the film, a second means operated by said motor in timed sequence to its operation of the first means to move the claw in one direction lengthwise of the film when the claw is in engagement with the film and to return the claw in the opposite direction when the claw is out of engagement with the film whereby the film is intermittently fed through the film gate, the shutter means being adapted to occlude light from the film in the interval of film movement, control means for disengaging one of said first and second means from the motor to stop movement of the film, the control means introducing a substitute load on the motor when said one of said first and second means is disengaged and the motor continuing to operate the other of said first and second means and the shutter means, the film having selected portions of its margin marked to indicate those frames which are to be temporarily halted for still projection, scanning means positioned to sense said marked portions of the film margin, said control means being operatively associated with said scanning means so as to instantaneously disengage said one means from the motor and introduce a substitute load on the motor when the scanning means senses a marked portion of the film margin, and timing means simultaneously actuated by the scanning means which cause the control means to reengage the one means with the motor and remove said substitute load from the motor at the end of a predetermined time interval to restore movement of the film through the gate.

2. In a motion picture projector having a light source, an objective, a film gate intermediate the objective and light source through which film is passed for projection of an image of each frame thereof onto a screen located forwardly of the objective, a shutter between the film gate and light source, and a continuously operating motor for rotating the same, a film engaging member, a first means for moving the member into and out of engagement with the film, a second means operatable in timed sequence to operation of the first means to move the member in one direction lengthwise of the film when the member is in engagement with the film and to return the member in the opposite direction when the member is out of engagement with the film whereby the film is intermittently fed through the film gate, drive means operatively connecting said first and second means to said motor such that the shutter means occludes light from the film in the intervals of film movement by the second means, said drive means including control means for inactivating said first means with respect to the film so as to stop movement of the film without stopping operation of the second means by the motor and said rotation of the shutter, said control means introducing a substitute load on the motor when said first means is deactivated with respect to the film, the film having selected portions of its margin of a different light transmission characteristic to indicate those frames of the film which are to be temporarily halted for still projection, photo means positioned to be responsive to changes in the light transmission characteristic of the margin of the film, said control means being operatively associated with said photo means so as to instantaneously inactivate said first means and introduce said substitute load on the motor when the photo means senses a change in the light transmission characteristic of the film margin, and timing means simultaneously actuated by the photo means which cause the control means to reactivate the first means at the end of a predetermined time interval so as to restore movement of the film through the film gate.

3. In a motion picture projector having a light source, an objective, a film gate intermediate the objective and light source through which film is passed for projection of an image of each frame thereof onto a screen located forwardly of the objective, a motor, shutter means located between the film gate and light source and adapted to be continuously driven by said motor, a film engaging claw, a first means operated by said motor for moving the claw into and out of engagement with the film, a second means operated by said motor in timed sequence to its operation of the first means to move the claw in one direction lengthwise of the film when the claw is in engagement with the film and to return the claw in the opposite direction when the claw is out of engagement with the film whereby the film is intermittently fed through the film gate, the shutter means being adapted to occlude light from the film in the interval of film movement, control means for disengaging one of said first and second means from the motor to stop movement of the film, the control means introducing a substitute load on the motor when the one of said first and second means is disengaged and the motor continuing to operate the other of said first and second means and the shutter means, the film having selected portions of its margin of a different light transmission character to indicate those frames which are to be temporarily halted for still projection, photo means positioned to be responsive to changes in the light transmission characteristic of the marginal portion of the film, said control means being operatively associated with said photo means so as to instantaneously disengage said one means from the motor and introduce the substitute load thereon when the photo means senses a change in the light transmission characteristic of the margin of the film, and timing means simultaneously actuated by the photo means to cause the control means to reengage the one means with the motor at the end of a predetermined time interval to restore movement of the film through said gate.

4. In the motion picture projector claimed in claim 3, means to override the timing means in order to restore the projector for motion picture operation before the end of the said predetermined time interval.

5. In a motion picture projector having a light source, an objective, a film gate intermediate the objective and light source through which film is passed for projection of an image of each frame thereof onto a screen located forwardly of the objective, a motor, shutter means located between the film gate and light source and adapted to be continuously driven by said motor, a film engaging claw, a first means operated by said motor for moving the claw into and out of engagement with the film, a second means operated by said motor in timed sequence to its operation of the first means to move the claw in one direction lengthwise of the film when the claw is in engagement with the film and to return the claw in the opposite direction when the claw is out of engagement with the film whereby the film is intermittently fed through the film gate, the shutter means being adapted to occlude light from the film in the interval of film movement, a solenoid operated clutch for disengaging one of said first and second means from the motor to stop movement of the film, a spring tensioned by said solenoid operated clutch to introduce a substitute load on the motor, the motor continuing to operate the other of said first and second means and the shutter means, the film having a trigger band extending along one of its margins, selected portions thereof being light transmitting to indicate those frames which are to be temporarily halted for still projection, the remainder of said trigger band inhibiting light transmission, a circuit connecting said solenoid to a source of electrical power, a light activated switch in said circut adapted to close in response to light impinging thereon through said selected portions of the trigger band so as to cause the solenoid operated clutch to instantaneously disengage said one means from the motor, and a circuit including timing means simultaneously completed by activation of said switch to deenergize the solenoid at the end of a determinable time interval so as to reengage the one means with the motor in order to restore movement of the film through said gate.

6. In a motion picture projector having a light source, an objective, a film gate intermediate the objective and light source through which film is passed for projection of an image of each frame thereof onto a screen located forwardly of the objective, a motor, shutter means located between the film gate and light source, and adapted to be continuously driven by said motor, a film engaging claw vertically slidable on a carriage, a first means operited by said motor for reciprocating the carriage horizontally to move the claw into and out of engagement with the film, a solenoid energizable to lower the film claw against the action of a spring in timed sequence to the horizontal reciprocation of the carriage to move the claw in one direction lengthwise of the film when the claw is in engagement with the film and to return the claw in the opposite direction when the claw is out of engagement with the film whereby the film is intermittently fed through the film gate, the shutter means being adapted to occlude light from the film in the interval of film movement, a reed relay circuit including a switch and a magnet spaced therefrom for operating said solenoid, the carriage coming between the reed relay switch and the magnet in its retracted position to deenergize the solenoid and allow the spring to raise the claw, the switch being closed on movement of the carriage forwardly to engage the claw with the film to energize the solenoid, the film having selected portions of its margin capable of transmitting light to indicate those frames which are to be temporarily halted for still projection, photo means positioned to be responsive to light passing through said portions and impinging thereon, control means operable by said photo means to inactivate said reed relay circuit to prevent operation of the solenoid and thereby to halt advance of the film to permit sustained projection of a still frame of the film thus aligned in the film gate, and timing means simultaneously actuated by the photo means to reactivate the reed relay circuit at the end of a predetermined time interval so as to restore movement of the film through said gate.

References Cited

UNITED STATES PATENTS

| | | | |
|---|---|---|---|
| 1,944,024 | 1/1934 | Foster et al. | 352—92 |
| 2,227,592 | 1/1941 | La Vezzi | 352—208 |
| 1,165,513 | 12/1915 | Kamm | 352—147 |

FOREIGN PATENTS

| | | |
|---|---|---|
| 1,140,072 | 11/1962 | Germany. |
| 812,020 | 4/1959 | Great Britain. |

NORTON ANSHER, *Primary Examiner.*

M. H. HAYES, *Assistant Examiner.*

U.S. Cl. X.R.

352—137, 178